United States Patent
Oda

(10) Patent No.: US 10,802,631 B2
(45) Date of Patent: Oct. 13, 2020

(54) DISPLAY CONTROL DEVICE, MOVING BODY DISPLAY DEVICE, AND DISPLAY CONTROL METHOD FOR DETERMINING ILLUMINANCE VALUE OF THE DISPLAY SCREEN

(71) Applicant: Mitsubishi Electric Corporation, Tokyo (JP)

(72) Inventor: Eishi Oda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/314,804

(22) PCT Filed: Aug. 8, 2016

(86) PCT No.: PCT/JP2016/073301
§ 371 (c)(1),
(2) Date: Jan. 2, 2019

(87) PCT Pub. No.: WO2018/029751
PCT Pub. Date: Feb. 15, 2018

(65) Prior Publication Data
US 2019/0313508 A1  Oct. 10, 2019

(51) Int. Cl.
*G06F 3/041* (2006.01)
*G06F 3/0489* (2013.01)
(Continued)

(52) U.S. Cl.
CPC ............ *G06F 3/0412* (2013.01); *B60K 35/00* (2013.01); *G06F 3/04897* (2013.01);
(Continued)

(58) Field of Classification Search
CPC ........ H05B 47/11; H05B 47/105; G09G 5/36; G09G 5/10; G09G 5/00; G09G 3/3406;
(Continued)

(56) References Cited

U.S. PATENT DOCUMENTS

2012/0162110 A1* 6/2012 Kobayashi ............ G06F 1/1643
                                                        345/173
2013/0328842 A1* 12/2013 Barnhoefer .......... G09G 3/3406
                                                        345/207
(Continued)

FOREIGN PATENT DOCUMENTS

JP          2007-302215 A       11/2007
JP          2008-020406 A        1/2008
(Continued)

OTHER PUBLICATIONS

International Search Report for PCT/JP2016/073301 (PCT/ISA/210) dated Oct. 25, 2016.

*Primary Examiner* — Darlene M Ritchie
(74) *Attorney, Agent, or Firm* — Birch, Stewart, Kolasch & Birch, LLP

(57) ABSTRACT

A display control device according to the present invention includes an illuminance value obtaining unit for obtaining an illuminance value of a display screen, a display image controlling unit for controlling a display image on the display screen on the basis of the illuminance value obtained, a distance determining unit for determining whether a distance between an object present around the display screen and the display screen is equal to or shorter than a threshold, and an illuminance value obtaining method determining unit for causing the illuminance value obtaining unit to apply a first obtaining method of the illuminance value when it is determined that the distance is not equal to or shorter than the threshold and causing the illuminance value obtaining unit to apply a second obtaining method of the illuminance value when it is determined that the distance is equal to or shorter than the threshold.

5 Claims, 7 Drawing Sheets

(51) Int. Cl.
  *B60K 35/00*    (2006.01)
  *G09G 3/34*    (2006.01)
  *G09G 5/36*    (2006.01)
  *G09G 5/10*    (2006.01)
  *G09G 5/00*    (2006.01)

(52) U.S. Cl.
  CPC ............ *G09G 3/3406* (2013.01); *G09G 5/00* (2013.01); *G09G 5/10* (2013.01); *G09G 5/36* (2013.01); *G09G 2360/144* (2013.01)

(58) Field of Classification Search
  CPC .............. G09G 2360/144; B60K 35/00; G06F 3/04897; G06F 3/041; G06F 3/0412
  See application file for complete search history.

(56) References Cited

U.S. PATENT DOCUMENTS

| | | | |
|---|---|---|---|
| 2015/0325207 A1 | 11/2015 | Hara | |
| 2017/0229059 A1* | 8/2017 | Bonnier | ................... G06F 3/044 |
| 2019/0098748 A1* | 3/2019 | Guo | ...................... G06F 1/1601 |

FOREIGN PATENT DOCUMENTS

| | | | | |
|---|---|---|---|---|
| JP | 2012-248974 A | | 12/2012 | |
| JP | 2014107153 A | * | 6/2014 | ............. H05B 37/02 |
| JP | 2015-215380 A | | 12/2015 | |

\* cited by examiner

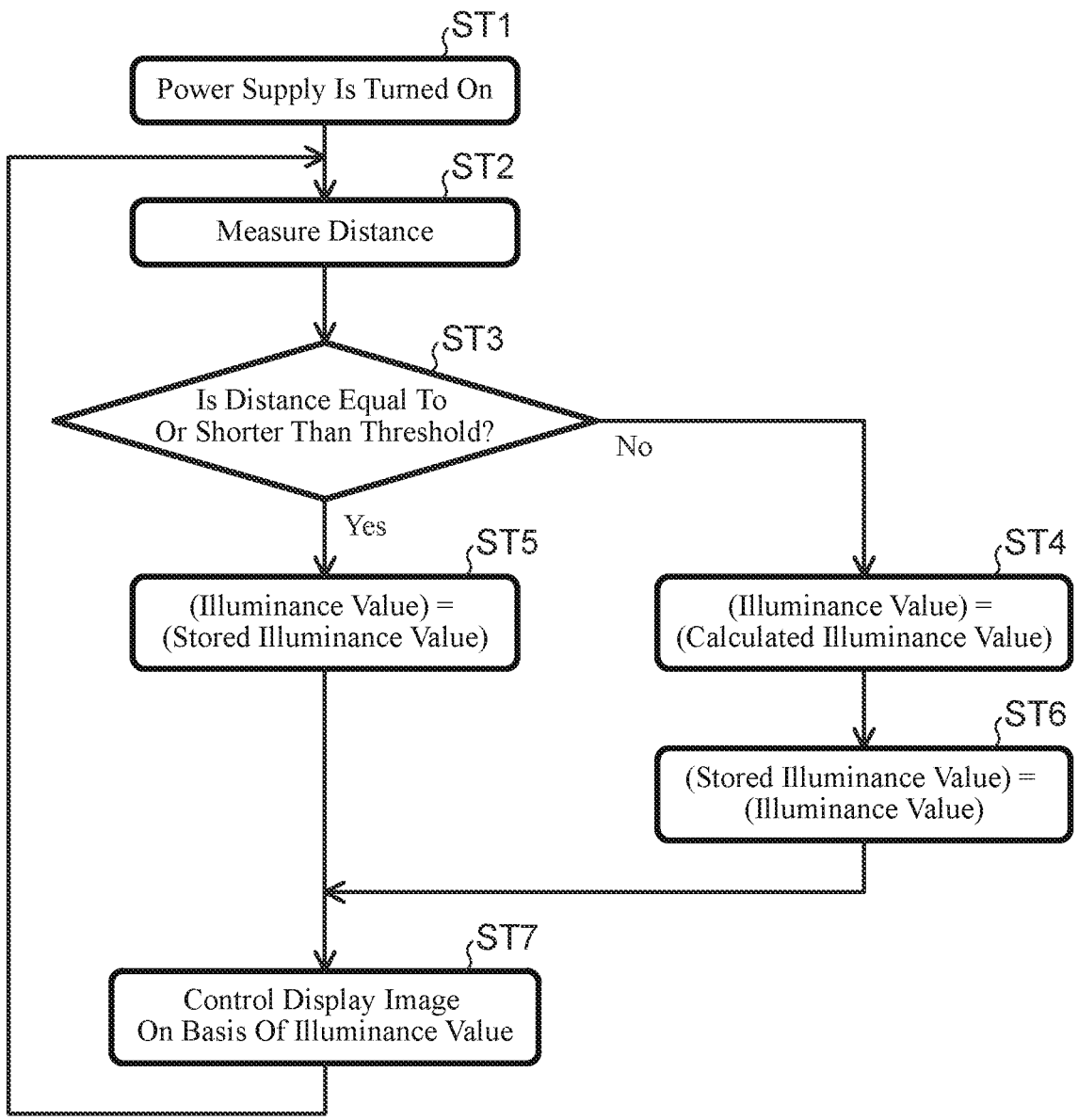

FIG. 4

```
ST1: Power Supply Is Turned On
  ↓
ST2: Measure Distance
  ↓
ST3: Is Distance Equal To Or Shorter Than Threshold?
  — Yes → ST9: (Illuminance Value) = (Illuminance Value Calculated While Illuminance Measuring Sensitivity Is Set To Illuminance Measuring Sensitivity Higher Than Normal Sensitivity)
  — No → ST8: (Illuminance Value) = (Illuminance Value Calculated While Illuminance Measuring Sensitivity Is Set To Normal Illuminance Measuring Sensitivity)
  ↓
ST7: Control Display Image On Basis Of Illuminance Value
  ↓ (loop back to ST2)
```

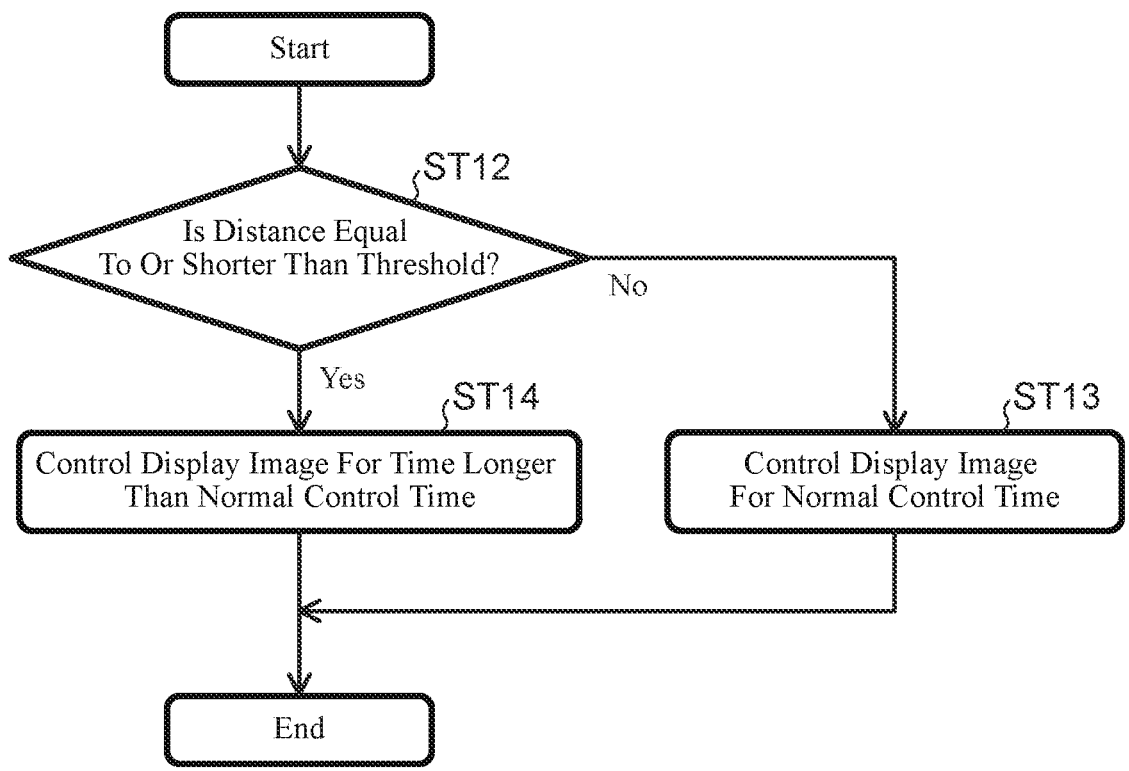

DISPLAY CONTROL DEVICE, MOVING BODY DISPLAY DEVICE, AND DISPLAY CONTROL METHOD FOR DETERMINING ILLUMINANCE VALUE OF THE DISPLAY SCREEN

TECHNICAL FIELD

The present invention relates to a display control device, for example, mounted on a vehicle, a moving body display device, and a display control method, and relates to a technology of controlling a display image on a display screen on the basis of illuminance of the display screen and presence or absence of a proximity object with respect to the display screen.

BACKGROUND ART

There is a car navigation device or the like which is provided with an illuminance sensor for obtaining an illuminance value from illuminance of light incident on a display screen thereof, and controls a display image on the display screen on the basis of the obtained illuminance value. The illuminance sensor is usually provided in the vicinity of the display screen to improve accuracy. For example, visibility of the display screen for a user is improved by making the display image on the display screen brighter (for example, increasing luminance) in a situation in which sunlight enters a vehicle as in sunny daytime because the situation makes the illuminance of the display screen increase (the illuminance value increases), and by making the display image on the display screen darker (for example, decreasing luminance) in a situation in which sunlight does not enter the vehicle as at night because the situation makes the illuminance of the display screen decrease (the illuminance value decreases).

There is also proposed a vehicle input device which is further provided with a proximity sensor for detecting presence or absence of a proximity object with respect to a display screen and controls a display image on the display screen on the basis of an illuminance value obtained by an illuminance sensor and a result of detection by the proximity sensor (refer to Patent Literature 1). Specifically, when the illuminance sensor determines that it is daytime (the illuminance value is high), when the proximity sensor determines that a hand approaches, an input unit for touch operation is displayed on the display screen, and then, when a predetermined time elapses after the hand moves away, the input unit for the touch operation is cleared. In addition, when the illuminance sensor determines that it is at night (the illuminance value is low), user's operability (visibility) is improved by displaying the input unit for the touch operation in a light color when it is determined that the hand is not approaching by the proximity sensor, and displaying the input unit for the touch operation in a deep color when it is determined that the hand is approaching.

CITATION LIST

Patent Literatures

Patent Literature 1: Japanese Patent Application Laid-Open No. 2007-302215 (page 14, FIG. 1)

SUMMARY OF INVENTION

Technical Problem

In the above-described conventional car navigation device or the like (display control device) provided with the display screen, when the hand is brought closer to operate an input unit arranged on the display screen or around the same, the illuminance of the illuminance sensor decreases, due to the shadow of the hand, to change the display image on the display screen (for example, darken the same) even though it is not necessary to change the display image on the display screen (for example, darken the same) because there is no change in the illuminance of the display screen. Thus, there is a problem of giving the user an uncomfortable feeling.

Similarly, in the above-described vehicle input device (display control device) provided with the illuminance sensor and the proximity sensor, when the hand is brought closer to operate the input unit for the touch operation arranged on the display screen in the daytime, the illuminance of the illuminance sensor decreases due to the shadow of the hand, and thus the input unit for the touch operation changes from non-display to display in a light color even though there is no change in the illuminance of the display screen, and then the input unit for the touch operation changes from the display in the light color to display in a deep color due to further approach of the hand in a series of actions. Thus, there is a problem of giving an uncomfortable feeling when the user visually recognizes the display screen.

The present invention is achieved in view of solving the above-described problems, and an object thereof is to provide a display control device, a moving body display device, and a display control method each of which is capable of reducing an uncomfortable feeling when the user visually recognizes a display screen by determining an obtaining method of the illuminance value of the display screen depending on the presence or absence of a proximity object with respect to the display screen and controlling the display image on the display screen on the basis of the obtained illuminance value.

Solution to Problem

A display control device according to the present invention includes a processor to execute a program and a memory to store the program which, when executed by the processor, performs processes of, obtaining an illuminance value of a display screen, controlling a display image on the display screen on the basis of the illuminance value obtained, determining whether a measured distance between an object present around the display screen and the display screen is equal to or shorter than a threshold determined in advance, causing a first obtaining method of the illuminance value to be applied in obtaining the illuminance value when it is determined that the distance is not equal to or shorter than the threshold and causing a second obtaining method of the illuminance value to be applied in obtaining the illuminance value when it is determined that the distance is equal to or shorter than the threshold, and when it is determined that the distance is equal to or shorter than the threshold, setting a time to control the display image on the display screen longer than a time to control the display image on the display screen when it is determined that the distance is not equal to or shorter than the threshold.

Advantageous Effects of Invention

The display control device configured in the above-described manner has the effect of reducing the uncomfortable feeling when the user visually recognizes the display screen by determining the obtaining method of the illuminance value of the display screen depending on the presence or absence of the proximity object with respect to the display screen and controlling the display image on the display screen on the basis of the obtained illuminance value.

BRIEF DESCRIPTION OF DRAWINGS

FIG. 3 is a flowchart illustrating operation of the electronic device including the display control device in the first embodiment of the present invention.

FIG. 4 is a flowchart illustrating operation of an electronic device including a display control device in a second embodiment of the present invention.

FIG. 7 is a flowchart illustrating characteristic operation of an electronic device including a display control device in a third embodiment of the present invention.

DESCRIPTION OF EMBODIMENTS

Hereinafter, embodiments of the present invention are described with reference to the drawings.

First Embodiment

A display control device in a first embodiment of the present invention is described with reference to FIGS. 1, 2, and 3.

Figure 1:
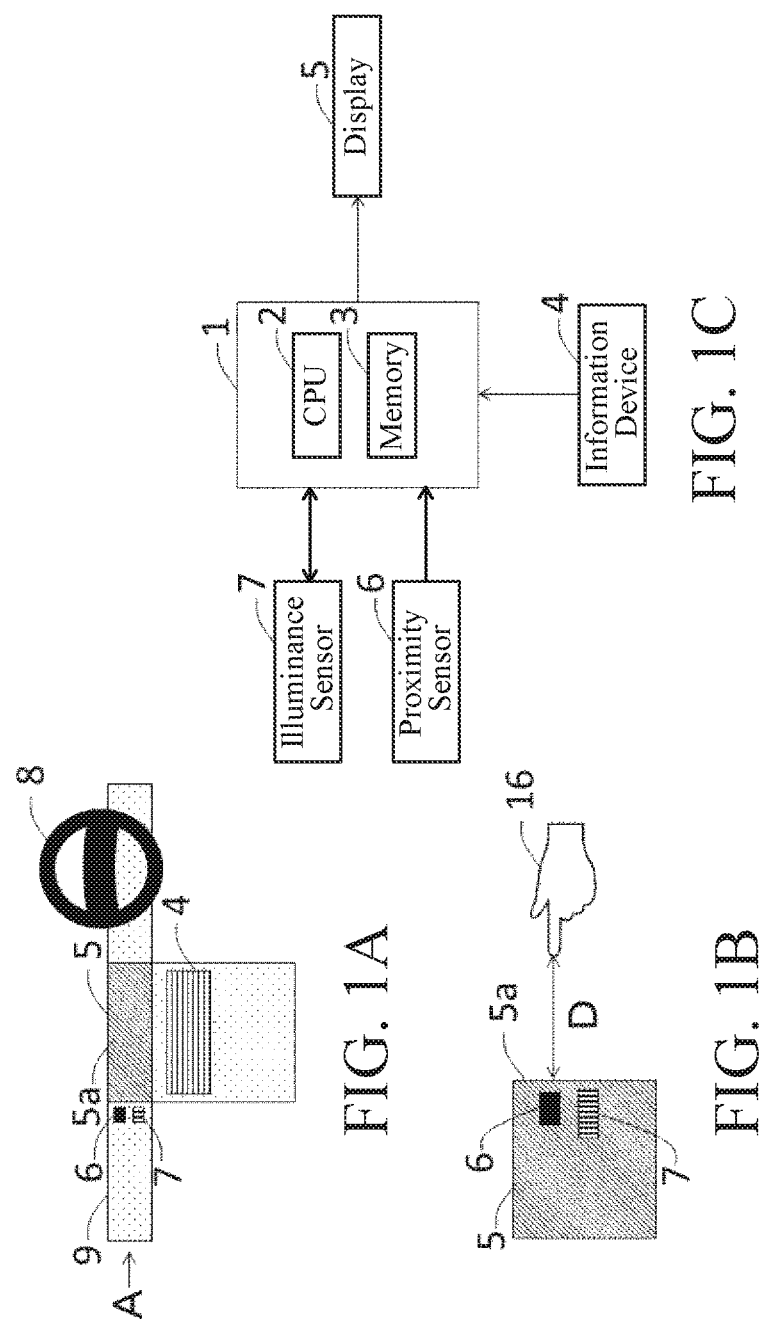
FIG. 1 is an example of a H/W configuration of an electronic device including a display control device in a first embodiment of the present invention.

FIG. 1 is an example of a H/W configuration of an electronic device including the display control device in the first embodiment of the present invention. FIG. 1A is a schematic diagram when a dashboard is seen from a vehicle seat side, FIG. 1B is a schematic diagram when a display 5, a proximity sensor 6, and an illuminance sensor 7 are seen from a direction A in FIG. 1A, and FIG. 1C is a diagram illustrating a connection relationship between pieces of H/W.

With reference to FIG. 1A, an arrangement of the electronic device including the display control device in the first embodiment is described. An information device 4, the display 5, a display control board 1 (not illustrated), the proximity sensor 6, and the illuminance sensor 7 are arranged on a dashboard 9, but an arrangement position is not limited to this; for example, the information device 4 and the display 5 may be integrated, and further, an operation button which is a hardware button of the information device 4 may be arranged on a display screen 5a of the display 5 as a software button by using a touch panel type display. Also, the information device 4 is not limited to an in-vehicle device, but may be a mobile terminal such as a portable phone to be connected to the display control board 1 by wire by using a USB cable and the like, or connected to the display control board 1 by radio by using Bluetooth (registered trademark) and the like.

With reference to FIG. 1C, operation of the electronic device including the display control device in the first embodiment is described.

The proximity sensor 6 measures a distance (hereinafter referred to as a "measurement distance") between an object present around the display screen 5a and the display screen 5a and outputs the same to the display control board 1. Herein, in the example of FIG. 1B, the measurement distance is a distance D between a hand 16 and the display screen 5a.

The illuminance sensor 7 intended to calculate an illuminance value corresponding to illuminance of light incident on the display screen 5a is preferably provided in the vicinity of the display screen 5a; the illuminance sensor 7 calculates the illuminance value from illuminance of light incident on the illuminance sensor 7 and outputs the same to the display control board 1. For example, assuming that the illuminance of the light incident on the illuminance sensor 7 is set to x and illuminance measuring sensitivity of the illuminance sensor 7 is set to a1 (for example, a1=1.0), an illuminance value y1 calculated by the illuminance sensor 7 is expressed by Equation (1); however, instead of this, a relationship expressed by Equation (2) or (3) may be used. Note that a1(x) in Equation (2) represents a function of x. Hereinafter, description will be made using a case in which Equation (1) is used.

(Equation 1)

$$y1 = a1 \cdot x \qquad \text{Equation (1)}$$

(Equation 2)

$$y1 = a1(x) \cdot x \qquad \text{Equation (2)}$$

(Equation 3)

$$y1 = a1 \cdot x \cdot x \qquad \text{Equation (3)}$$

The display control board 1 including a CPU 2 and a memory 3 adjusts luminance of an image signal input from the information device 4 on the basis of the obtained illuminance value and outputs the adjusted image signal to the display 5. For example, to increase user's visibility of a display image displayed on the display screen 5a, when the obtained illuminance value is high, the luminance of the image signal is increased, and when the obtained illuminance value is low, the luminance of the image signal is decreased. Note that although the luminance of the image signal is adjusted in the above description, it is also possible to change the image signal by changing a γ value and the like.

The display 5 outputs the image signal input from the display control board 1 on the display screen 5a.

Herein, when the user brings his/her hand or the like closer to operate an operation button on the display screen 5a and the illuminance sensor 7 comes into a shadow of the hand or the like, the illuminance sensor 7 calculates a value lower than the illuminance value corresponding to the illuminance of the light incident on the display screen 5a. Thus, when the image signal output on the display screen 5a is controlled on the basis of the calculated illuminance value, the display image is changed (for example, the luminance is decreased) even though it is not necessary to change the display image on the display screen 5a (for example, decrease the luminance), thus giving an uncomfortable feeling when the user visually recognizes the display screen 5a. On the other hand, in the display control device in the first embodiment, by determining an obtaining method of the illuminance value on the basis of the measurement distance measured by the proximity sensor 6, the uncomfortable feeling when the user visually recognizes the display screen 5a is reduced. The obtaining method of the illuminance value is described in detail in the description with reference to FIGS. 2 and 3.

Figure 2:
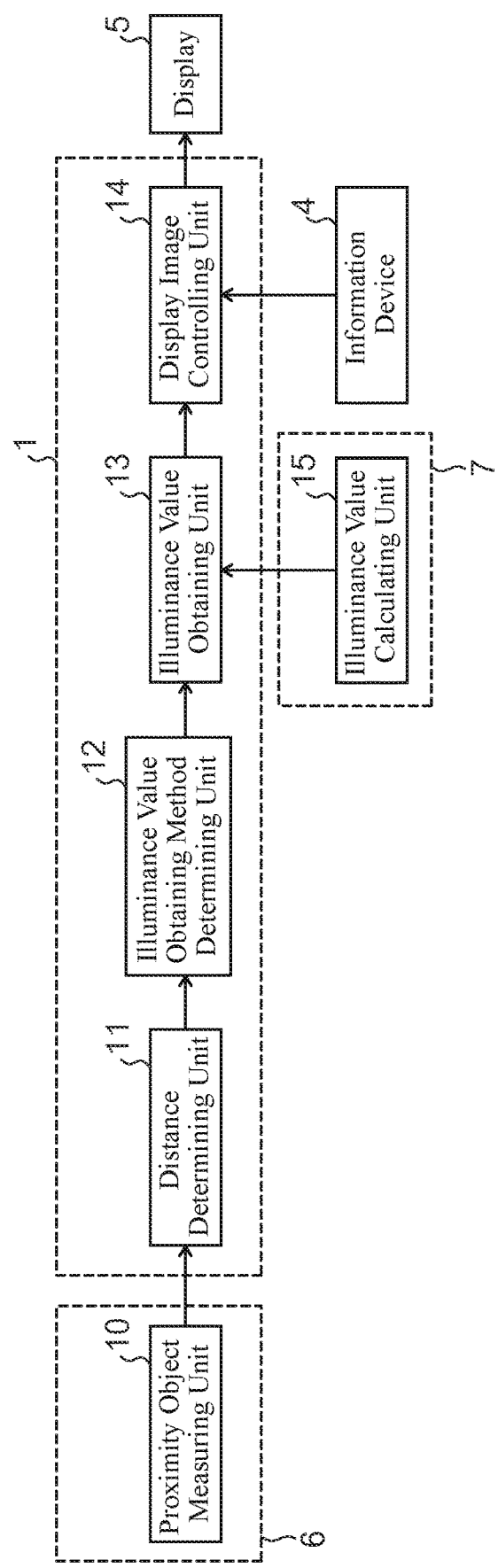
FIG. 2 is a block diagram of the electronic device including the display control device in the first embodiment of the present invention.

FIG. 2 is a block diagram of the electronic device including the display control device in the first embodiment of the present invention.

A proximity object measuring unit 10 is formed of the proximity sensor 6. The proximity sensor 6 measures the distance between the object present around the display screen 5a and the display screen 5a and outputs the same to a distance determining unit 11. Note that, when there is no object within a measurement range of the proximity sensor 6, a value determined in advance such as a null value is output. Hereinafter, description will be made assuming that the null value is output.

The distance determining unit 11 is formed of the CPU 2 and the memory 3 of the display control board 1. The CPU 2 compares the measurement distance input from the proximity object measuring unit 10 with a threshold stored in the memory 3, determines whether the measurement distance is equal to or shorter than the threshold, and outputs a determination result to an illuminance value obtaining method determining unit 12. Herein, when the measurement distance is the null value, it is determined that the measurement distance is not equal to or shorter than the threshold.

Note that it is preferable to set, as the threshold, a distance between the object and the display screen 5a, in the case of the distance, the illuminance sensor 7 enters the shadow of the object when the object such as the hand is brought closer to the display screen 5a. Also, the threshold stored in the memory 3 may be changed depending on preference of the user.

Herein, as the proximity sensor 6, for example, there is an infrared sensor which calculates the distance from an object by using a time until an emitted infrared ray is reflected by the object to be received, or an infrared sensor which determines the presence or absence of a proximity object by using an amount of received light which results from reflection of an emitted infrared ray by the object. In a case of the latter infrared sensor also, the distance from the object is calculated by using the amount of the received light when the infrared sensor determines whether the proximity object is present within a distance determined in advance.

The illuminance value obtaining method determining unit 12 is formed of the CPU 2 of the display control board 1. The CPU 2 determines the obtaining method of the illuminance value on the basis of the determination result input from the distance determining unit 11 and outputs the same to an illuminance value obtaining unit 13. That is, when the determination result shows that the measurement distance is not equal to or shorter than the threshold, a first obtaining method is used, and when the determination result shows that the measurement distance is equal to or shorter than the threshold, a second obtaining method is used.

The illuminance value calculating unit 15 is formed of the illuminance sensor 7. The illuminance sensor 7 calculates the illuminance value from the illuminance of the light incident on the illuminance sensor 7 and outputs the same to the illuminance value obtaining unit 13.

The illuminance value obtaining unit 13 is formed of the CPU 2 and the memory 3 of the display control board 1. When the obtaining method input from the illuminance value obtaining method determining unit 12 is the first obtaining method, the CPU 2 outputs the illuminance value input from the illuminance value calculating unit 15 to a display image controlling unit 14 and causes the memory 3 to store the same. Also, when the obtaining method input from the illuminance value obtaining method determining unit 12 is the second obtaining method, the CPU 2 outputs the illuminance value stored in the memory 3 to the display image controlling unit 14. When the illuminance value is not stored in the memory 3 as immediately after power supply of the display control device is turned on, the first obtaining method may be applied, but another way may be used. For example, a value determined in advance may be output to the display image controlling unit 14 and stored in the memory 3.

The display image controlling unit 14 is formed of the CPU 2 of the display control board 1. The CPU 2 adjusts the luminance of the image signal input from the information device 4 or changes the γ value on the basis of the illuminance value input from the illuminance value obtaining unit 13, and outputs the image signal after processing to the display 5.

The display control device includes the distance determining unit 11, the illuminance value obtaining method determining unit 12, the illuminance value obtaining unit 13, and the display image controlling unit 14. Therefore, in the above-described configuration, the display control device includes the display control board 1.

Note that each block is not limited to the above-described configuration as long as a similar function is achieved; for example, the distance determining unit 11 may be formed of a CPU and a memory mounted on the proximity sensor 6, and the illuminance value obtaining unit 13 may be formed of a CPU and a memory mounted on the illuminance sensor 7. In this case, the display control device includes the display control board 1 and at least one of the proximity sensor 6 and the illuminance sensor 7.

Also, a moving body display device includes the display control device and the display 5. This is because the present invention reduces the uncomfortable feeling occurring when a display screen (the display screen 5a) of a display device mounted on a moving body is visually recognized, and causes an image to be displayed on the display screen by controlling the image using the display control device. Note that the moving body display device may have any configuration as long as a similar function is achieved irrespective of whether the display control device and the display 5 are separated from each other or integrated.

Next, operation of the display control device in the first embodiment is described in detail with reference to a flowchart. FIG. 3 is a flowchart illustrating the operation of the electronic device including the display control device in the first embodiment of the present invention.

When the power supply of the display control device is turned on, the operation is started. (Step ST1)

At step ST2, the proximity object measuring unit 10 measures the distance between the object such as the hand present around the display screen 5a and the display screen 5a, and the procedure proceeds to step ST3.

At step ST3, when the distance determining unit 11 determines that the distance measured at step ST2 is not equal to or shorter than the threshold determined in advance, the illuminance value obtaining method determining unit 12 determines that the first obtaining method is applied as the obtaining method of the illuminance value and the procedure proceeds to step ST4. Similarly, when the distance determining unit 11 determines that the distance measured at step ST2 is equal to or shorter than the threshold determined in advance, the illuminance value obtaining method determining unit 12 determines that the second obtaining method is applied as the obtaining method of the illuminance value and the procedure proceeds to step ST5.

At step ST4, the illuminance value obtaining unit 13 obtains the illuminance value calculated by the illuminance value calculating unit 15, and the procedure proceeds to step ST6.

At step ST6, the illuminance value obtained at step ST4 is stored, and the procedure proceeds to step ST7.

At step ST5, the illuminance value obtaining unit 13 obtains the illuminance value stored at step ST6, and the procedure proceeds to step ST7. Note that, when step ST6 is not performed after the power supply is turned on and the procedure reaches step ST5, steps ST4 and ST6 are performed.

At step ST7, the display image controlling unit 14 controls the display image displayed on the display screen 5a by adjusting the luminance of the image signal input from the information device 4, changing the γ value or the like on the basis of the illuminance value obtained at step ST4 or step ST5, and the procedure proceeds to step ST2.

As described above, even when the object such as the hand is brought closer to the display screen 5a and the illuminance of the light incident on the illuminance sensor 7 decreases due to entry of the illuminance sensor 7 into the shadow of the object, the display control device described in the first embodiment inhibits the illuminance value input to the display image controlling unit 14 from changing. Thus, it is possible to make the illuminance value input to the display image controlling unit 14 more appropriate.

That is, the display control device described in the first embodiment has the effect of reducing the uncomfortable feeling when the user visually recognizes the display screen 5a, by determining the obtaining method of the illuminance value of the display screen 5a depending on whether there is a proximity object with respect to the display screen 5a and by controlling the display image on the display screen 5a on the basis of the obtained illuminance value.

Also, the proximity object measuring unit 10, the illuminance value calculating unit 15, the information device 4, and the display 5 each have the configuration similar to that of an existing electronic device, and the distance determining unit 11, the illuminance value obtaining method determining unit 12, the illuminance value obtaining unit 13, and the display image controlling unit 14 which are formed of the CPU 2 and the memory 3 can operate by downloading a program onto an existing display control board 1, thus having the effect of achieving all of these by using an existing electronic device.

Second Embodiment

A display control device in a second embodiment of the present invention is described with reference to FIG. 4. Note that, in FIG. 4, the same reference sign as that in FIG. 3 represents the same or corresponding portion. The first embodiment works so that the illuminance value input to the display image controlling unit 14 is not changed when the object such as the hand brought closer to the display screen 5a approaches so that the illuminance sensor 7 enters the shadow of the object; however, when the vehicle enters a tunnel at that timing, a display image is kept as is even though it is necessary to change luminance and the like of the display image on the display screen 5a in response to significant decrease of illuminance of light incident on the display screen 5a, thus giving the user the uncomfortable feeling (especially in the daytime). Therefore, in the second embodiment, in a second obtaining method for obtaining the illuminance value, the illuminance value is obtained using illuminance measuring sensitivity higher than that in the first obtaining method. Hereinafter, operation different from that of the first embodiment is described.

FIG. 4 is a flowchart illustrating operation of an electronic device including the display control device in the second embodiment of the present invention. As described above, the obtaining method of the illuminance value is different from that in the first embodiment; specifically, operation at step ST9 is different. As for step ST8, an expression different from that at step ST4 in the first embodiment is used for convenience, but an operation content is the same, and the illuminance measuring sensitivity in the first obtaining method is defined as normal illuminance measuring sensitivity.

At step ST3, when an illuminance value obtaining method determining unit 12 determines that the second obtaining method is applied as the obtaining method of the illuminance value, the procedure proceeds to step ST9; at step ST9, the illuminance value calculated while the illuminance measuring sensitivity is set to higher than normal sensitivity is obtained and the procedure proceeds to step ST7. That is, at step ST8, the illuminance value calculated by Equation (1) is obtained, but at step ST9, the illuminance value calculated by Equation (4) while the illuminance measuring sensitivity is set to a2 higher than normal a1 is obtained. (For example, a1=1.0, a2=1.5)

(Equation 4)

$$y1 = a2 \cdot x \quad \text{Equation (4)}$$

Since the illuminance value calculated by an illuminance value calculating unit 15 to be input to an illuminance value obtaining unit 13 is calculated while the illuminance measuring sensitivity is set to the normal illuminance measuring sensitivity a1, the illuminance value obtaining unit 13 obtains an illuminance value by increasing the illuminance measuring sensitivity in a pseudo manner by dividing the illuminance value input from the illuminance value calculating unit 15 by a1 and multiplying the same by a2 when the obtaining method input from the illuminance value obtaining method determining unit 12 is the second obtaining method. Note that the illuminance value obtaining unit 13 may be formed of a CPU mounted on an illuminance sensor 7, and obtain the illuminance value by increasing the illuminance measuring sensitivity in a pseudo manner as in the above-described case. In addition, in a case of an illuminance sensor capable of changing setting of the illuminance measuring sensitivity of the illuminance value calculating unit 15, it is possible for the illuminance value obtaining unit 13 to instruct, depending on the obtaining method input from the illuminance value obtaining method determining unit 12, the illuminance value calculating unit 15 to set the illuminance measuring sensitivity of the illuminance value calculating unit 15.

As described above, even when the object such as the hand is brought closer to a display screen 5a and the illuminance of the light incident on the illuminance sensor 7 decreases due to entry of the illuminance sensor 7 into the shadow of the object, the display control device described in the second embodiment can inhibit the illuminance value input to a display image controlling unit 14 from decreasing by making the illuminance measuring sensitivity higher than the normal sensitivity. Therefore, it is possible to obtain the illuminance value corresponding to the illuminance of the light incident on the display screen 5a. As a result, the display control device described in the second embodiment has an effect similar to that of the display control device in the first embodiment and has the effect of further reducing the uncomfortable feeling when the user visually recognizes the display screen 5a.

First Variation of Second Embodiment

Figure 5:
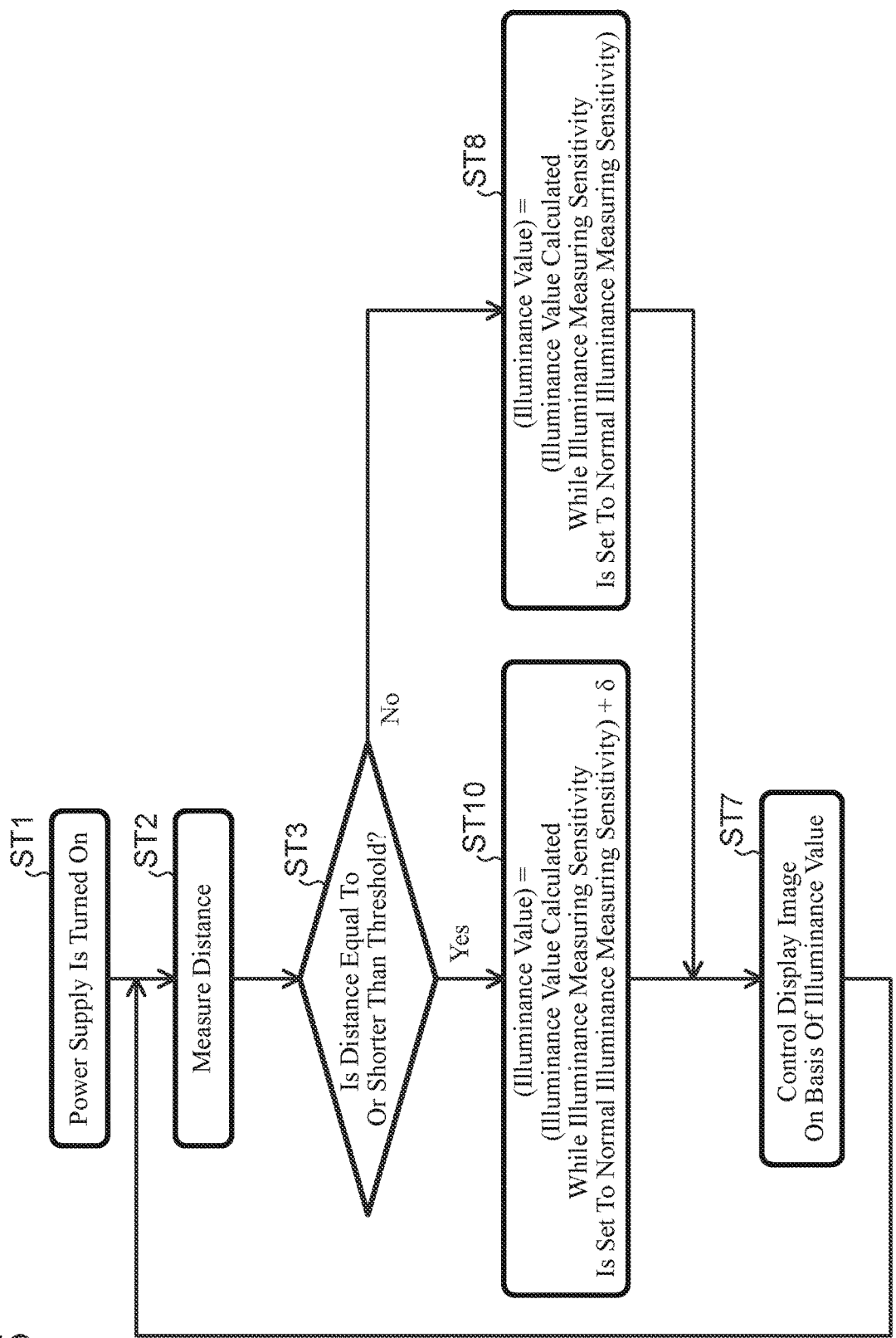
FIG. 5 is a flowchart illustrating operation of an electronic device including a display control device in a first variation of the second embodiment of the present invention.

A display control device in a first variation of the second embodiment of the present invention is described with reference to FIG. 5. In FIG. 5, the same reference sign as that in FIG. 4 represents the same or corresponding portion. As to a second obtaining method for obtaining an illuminance value, although the illuminance value is obtained using the illuminance measuring sensitivity higher than that in the first obtaining method in the second embodiment, in the first variation of the second embodiment, a value obtained by adding an offset, which is a correction value, to the illuminance value calculated using the same illuminance measuring sensitivity as that in the first obtaining method is obtained as the illuminance value. Hereinafter, operation different from that of the second embodiment is described.

FIG. 5 is a flowchart illustrating operation of an electronic device including the display control device in the first variation of the second embodiment of the present invention. As described above, the second obtaining method of the illuminance value is different from that in the second embodiment, and specifically, operation at step ST10 is different.

At step ST3, when an illuminance value obtaining method determining unit 12 determines that the second obtaining method is applied as the obtaining method of the illuminance value, the procedure proceeds to step ST10; at step ST10, a value obtained by adding δ (for example, δ=1.0) being the offset to the illuminance value calculated while illuminance measuring sensitivity is set to normal illuminance measuring sensitivity is obtained and the procedure proceeds to step ST7. That is, at step ST8, the illuminance value calculated by Equation (1) is obtained, but at step ST10, the illuminance value calculated by Equation (5) is obtained.

(Equation 5)

$$y1 = a1 \cdot x + \delta \quad \text{Equation (5)}$$

Since no offset is added to the illuminance value calculated by an illuminance value calculating unit 15 and input to an illuminance value obtaining unit 13, the illuminance value obtaining unit 13 obtains an illuminance value obtained by adding δ to the illuminance value input from the illuminance value calculating unit 15 when the obtaining method input from the illuminance value obtaining method determining unit 12 is the second obtaining method. Note that the illuminance value obtaining unit 13 may be formed of a CPU mounted on an illuminance sensor 7, and obtain the illuminance value by adding the offset in the manner similar to that described above. In addition, in a case of an illuminance sensor capable of changing setting of whether to add the offset by the illuminance value calculating unit 15, it is possible for the illuminance value obtaining unit 13 to instruct, depending on the obtaining method input from the illuminance value obtaining method determining unit 12, the illuminance value calculating unit 15 to set whether to add the offset by the illuminance value calculating unit 15.

As described above, even when an object such as a hand is brought closer to a display screen 5a and the illuminance of the light incident on the illuminance sensor 7 decreases due to entry of the illuminance sensor 7 into the shadow of the object, the display control device described in the first variation of the second embodiment can inhibit the illuminance value input to a display image controlling unit 14 from decreasing by adding the offset. Therefore, it is possible to obtain the illuminance value corresponding to the illuminance of the light incident on the display screen 5a. As a result, the display control device described in the first variation of the second embodiment has an effect similar to that of the display control device in the first embodiment and has the effect of further reducing an uncomfortable feeling when the user visually recognizes the display screen 5a.

Second Variation of Second Embodiment

Figure 6:
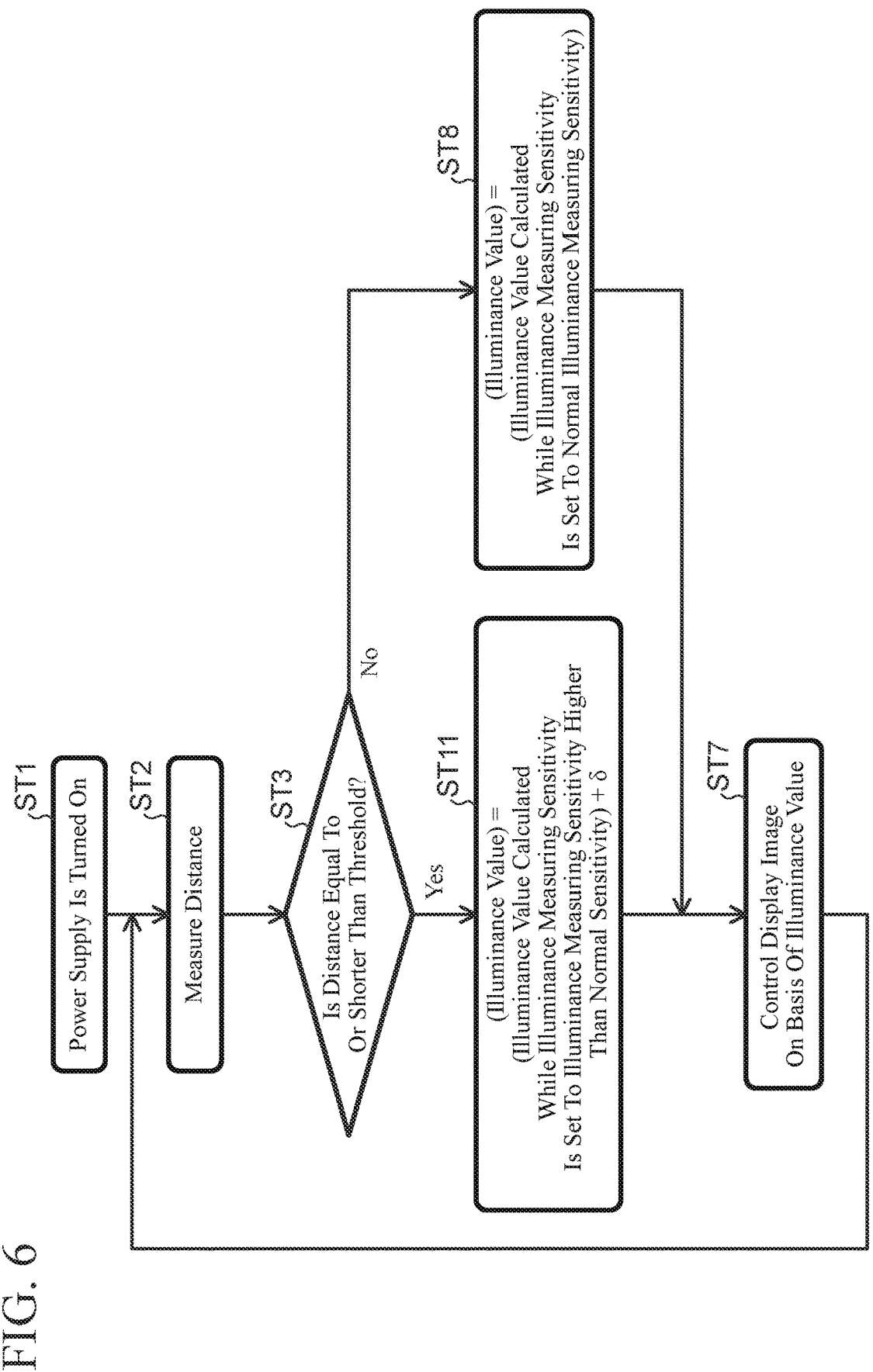
FIG. 6 is a flowchart illustrating operation of an electronic device including a display control device in a second variation of the second embodiment of the present invention.

A display control device in a second variation of the second embodiment of the present invention is described with reference to FIG. 6. In FIG. 6, the same reference sign as that in FIG. 4 or 5 represents the same or corresponding portion. As to the second obtaining method for obtaining the illuminance value, the illuminance value is obtained using the illuminance measuring sensitivity higher than that in the first obtaining method in the second embodiment, and a value obtained by adding the offset to the illuminance value calculated using the same illuminance measuring sensitivity as that in the first obtaining method is obtained as the illuminance value in the first variation of the second embodiment. However, as to a second obtaining method, a value obtained by adding an offset to an illuminance value calculated using illuminance measuring sensitivity higher than that in the first obtaining method is obtained as an illuminance value in the second variation of the second embodiment. That is, the second obtaining methods of the second embodiment and the first variation of the second embodiment are applied. Hereinafter, operation different from that of the second embodiment is described.

FIG. 6 is a flowchart illustrating operation of an electronic device including the display control device in the second variation of the second embodiment of the present invention. As described above, the second obtaining method of the illuminance value is different from that in the second embodiment, and specifically, operation at step ST11 is different.

At step ST3, when an illuminance value obtaining method determining unit 12 determines that the second obtaining method is applied as the obtaining method of the illuminance value, the procedure proceeds to step ST11; at step ST11, a value obtained by adding the offset to an illuminance value calculated while illuminance measuring sensitivity is set to illuminance measuring sensitivity higher than normal sensitivity is obtained and the procedure proceeds to step ST7. That is, at step ST8, the illuminance value calculated by Equation (1) is obtained, but at step ST11, the illuminance value calculated by Equation (6) is obtained.

(Equation 6)

$$y1 = a2 \cdot x + \delta \quad \text{Equation (6)}$$

Since the illuminance value calculated by an illuminance value calculating unit 15 to be input to an illuminance value obtaining unit 13 is calculated while the illuminance measuring sensitivity is set to normal illuminance measuring sensitivity a1, the illuminance value obtaining unit 13 obtains an illuminance value by dividing the illuminance value input from the illuminance value calculating unit 15 by a1, multiplying the same by a2, and then adding δ to the result when the obtaining method input from the illuminance value obtaining method determining unit 12 is the second obtaining method. Note that the illuminance value obtaining unit 13 may be formed of a CPU mounted on an illuminance sensor 7, and obtain the illuminance value by increasing the illuminance measuring sensitivity in a pseudo manner as in the above-described case and further adding the offset. In addition, in a case of an illuminance sensor capable of changing setting of the illuminance measuring sensitivity of the illuminance value calculating unit 15 and whether to add the offset by the illuminance value calculating unit 15, it is possible for the illuminance value obtaining unit 13 to instruct, depending on the obtaining method input from the illuminance value obtaining method determining unit 12, the illuminance value calculating unit 15 to set the illuminance measuring sensitivity and whether to add the offset by the illuminance value calculating unit 15.

As described above, even when an object such as a hand is brought closer to a display screen 5a and the illuminance of the light incident on the illuminance sensor 7 decreases due to entry of the illuminance sensor 7 into the shadow of the object, the display control device described in the second variation of the second embodiment can inhibit the illuminance value input to a display image controlling unit 14 from decreasing by increasing the illuminance measuring sensitivity from the normal sensitivity and adding the offset. Therefore, it is possible to obtain the illuminance value corresponding to the illuminance of the light incident on the display screen 5a. As a result, the display control device described in the second variation of the second embodiment has an effect similar to that of the display control device in the first embodiment and has the effect of further reducing an uncomfortable feeling when the user visually recognizes the display screen 5a.

Third Embodiment

A display control device in a third embodiment of the present invention is described with reference to FIGS. 2, 4, 5, 6, and 7. In the second embodiment including the variations, when the object such as the hand is brought closer to the display screen 5a and the illuminance value input to the display image controlling unit 14 changes due to entry of the illuminance sensor 7 into the shadow of the object, a display image on the display screen 5a is eventually changed. That is, although it is possible to reduce an uncomfortable feeling when the user visually recognizes the display screen 5a, this reduction is sometimes not sufficient. Therefore, in the third embodiment, in order to reduce the above-described uncomfortable feeling in a case of obtaining an illuminance value as in the case of the display control device in the second embodiment, a control method for an image signal in a display image controlling unit 14 is changed on the basis of a determination result generated by a distance determining unit 11. That is, operation at step ST7 is made different in FIG. 4, 5, or 6 which are the flowcharts illustrating the operation of the display control device in the second embodiment including the variations. Hereinafter, operation different from that of the second embodiment is described.

A block diagram of an electronic device including the display control device in the third embodiment is similar to the block diagram in the first embodiment illustrated in FIG. 2; note that a block diagram in the second embodiment is also similar to the block diagram in the first embodiment. However, the determination result generated by the distance determining unit 11 is input to the display image controlling unit 14 via an illuminance value obtaining method determining unit 12 and an illuminance value obtaining unit 13. The display image controlling unit 14 controls the image signal input from an information device 4 depending on the determination result generated by the distance determining unit 11 and input from the illuminance value obtaining unit 13 to output the controlled image signal to a display 5. The display image controlling unit 14 is formed of a memory 3 in addition to a CPU 2 of a display control board 1.

Next, operation of the display control device in the third embodiment is described in detail with reference to a flowchart. FIG. 7 is a flowchart illustrating characteristic operation of the electronic device including the display control device in the third embodiment of the present invention. As described above, the operation of the display control device in the third embodiment is similar to that in the second embodiment including the variations up to a step of obtaining the illuminance value, and the operation at step ST7 is as illustrated in FIG. 7.

When the illuminance value is obtained at step ST8, ST9, ST10, or ST11, the procedure proceeds to step ST12.

At step ST12, the display image controlling unit 14 operates on the basis of the determination result generated by the distance determining unit 11 and input from the illuminance value obtaining unit 13. That is, when the determination result shows that a measurement distance is not equal to or shorter than a threshold determined in advance, the procedure proceeds to step ST13, and when the determination result shows that the measurement distance is equal to or shorter than the threshold determined in advance, the procedure proceeds to step ST14.

At step ST13, the display image controlling unit 14 determines the image signal indicating a display image to be displayed on a display screen 5a (hereinafter, the determined display image is referred to as a "determined display image 1") by adjusting luminance of the image signal input from the information device 4, changing a γ value or the like on the basis of the illuminance value obtained at step ST8, and the display image controlling unit 14 causes transition from the display image displayed on the display screen 5a to the determined display image 1 to take t1 seconds determined in advance. Then, the procedure proceeds to step ST2. The time for controlling the display image on the display screen 5a at this step is defined as a normal control time.

At step ST14, the display image controlling unit 14 determines the image signal indicating a display image to be displayed on the display screen 5a (hereinafter, the determined display image is referred to as a "determined display image 2") by adjusting luminance of the image signal input from the information device 4, changing a γ value or the like on the basis of the illuminance value obtained at step ST9, ST10, or ST11, and the display image controlling unit 14 causes transition from the display image displayed on the display screen 5a to the determined display image 2 to take t2 seconds determined in advance. Then, the procedure proceeds to step ST2.

Herein, t1 and t2 are stored in the memory 3 and have a relationship of t1<t2.

Note that although a screen transition time is fixed to t1 and t2 at steps ST13 and ST14, respectively, the transition may be performed at a fixed speed to transition at constant speeds of v1 and v2 at steps ST13 and ST14, respectively. Herein, v1 and v2 are stored in the memory 3 and have a relationship of v1>v2. As a result, as in a case in which the screen transition time is fixed, the transition time of the display image is longer at step ST14 than at step ST13.

Also, while the screen transition time is fixed to t1 and t2 at steps ST13 and ST14, respectively, screen transition speed may be variable to decelerate just before screen transition is completed. This makes it possible to further reduce the uncomfortable feeling when the user visually recognizes the display screen 5a.

As described above, the display control device illustrated in the third embodiment has an effect similar to that of the display control device in the second embodiment including the variation.

There is a case in which, when the object such as the hand is brought closer to the display screen 5a, the illuminance value input to the display image controlling unit 14 changes due to entry of an illuminance sensor 7 into the shadow of the object, so that the display image on the display screen 5a is changed, and thus the user feels uncomfortable when visually recognizing the display screen 5; however, the display control device illustrated in the third embodiment has the effect of further reducing the uncomfortable feeling by extending the transition time of the display image.

Although the display control device, the moving body display device, and the display control method of the present invention in a vehicle-mounted device are described, the present invention is not limited thereto, and may be used in a device mounted on a moving body such as an aircraft and an electric train. Also, the configuration of each unit may be replaced with configuration having the similar function. For example, the proximity sensor 6 may be replaced with image recognition by a camera.

REFERENCE SIGNS LIST

1: Display control board, 2: CPU, 3: Memory, 4: Information device, 5: Display, 5a: Display screen, 6: Proximity sensor, 7: Illuminance sensor, 8: Steering wheel, 9: Dashboard, 10: Proximity object measuring unit, 11: Distance determining unit, 12: Illuminance value obtaining method determining unit, 13: Illuminance value obtaining unit, 14: Display image controlling unit, 15: Illuminance value calculating unit, 16: Hand

The invention claimed is:

1. A display control device comprising:
a processor to execute a program; and
a memory to store the program which, when executed by the processor, performs processes of,
  obtaining an illuminance value of a display screen;
  controlling a display image on the display screen on a basis of the illuminance value obtained;
  determining whether a measured distance between an object present around the display screen and the display screen is equal to or shorter than a threshold determined in advance;
  causing a first obtaining method of the illuminance value to be applied in obtaining the illuminance value when it is determined that the distance is not equal to or shorter than the threshold and causing a second obtaining method of the illuminance value to be applied in obtaining the illuminance value when it is determined that the distance is equal to or shorter than the threshold;
  determining a determined display image to be displayed on the display screen by adjusting luminance of the display image based on the obtained illuminance value;
  when it is determined that the distance is equal to or shorter than the threshold, setting a first transition time to control the display image on the display screen to transition to the determined display image longer than a second transition time to control the display image on the display screen to transition to the determined display image when it is determined that the distance is not equal to or shorter than the threshold; and
  wherein the second transition time is greater than zero.

2. The display control device according to claim 1, wherein
the first obtaining method sets a value calculated with illuminance measuring sensitivity determined in advance as the illuminance value, and
the second obtaining method applies at least one of:
setting a value calculated with illuminance measuring sensitivity determined in advance higher than the illuminance measuring sensitivity in the first obtaining method as the illuminance value, and
setting a value obtained by adding an offset to the value calculated by the first obtaining method as the illuminance value.

3. A moving body display device comprising:
the display control device according to claim 1; and
a display to output an image signal input from the display control device.

4. A moving body display device comprising:
the display control device according to claim 2; and
a display to output an image signal input from the display control device.

5. A display control method comprising:
obtaining an illuminance value of a display screen;
controlling a display image on the display screen on a basis of the illuminance value obtained;
determining whether a measured distance between an object present around the display screen and the display screen is equal to or shorter than a threshold determined in advance;
causing a first obtaining method of the illuminance value to be applied in obtaining the illuminance value when it is determined that the distance is not equal to or shorter than the threshold and causing a second obtaining method of the illuminance value to be applied in obtaining the illuminance value when it is determined that the distance is equal to or shorter than the threshold;
determining a determined display image to be displayed on the display screen by adjusting luminance of the display image based on the obtained illuminance value;
when it is determined that the distance is equal to or shorter than the threshold, setting a first transition time to control the display image on the display screen to transition to the determined display image longer than a second transition time to control the display image on the display screen to transition to the determined display image when it is determined that the distance is not equal to or shorter than the threshold; and
wherein the second transition time is greater than zero.

* * * * *